Dec. 11, 1956  N. DODDS  2,773,474
BIRD FEEDER
Filed Nov. 10, 1954
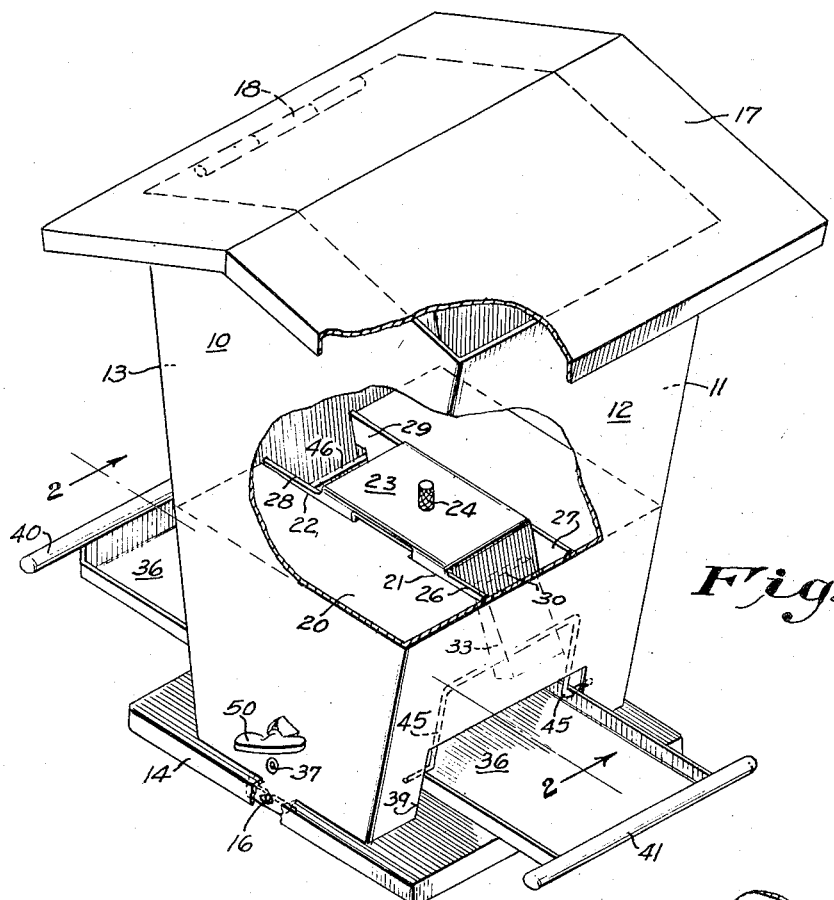
*Fig. 1*
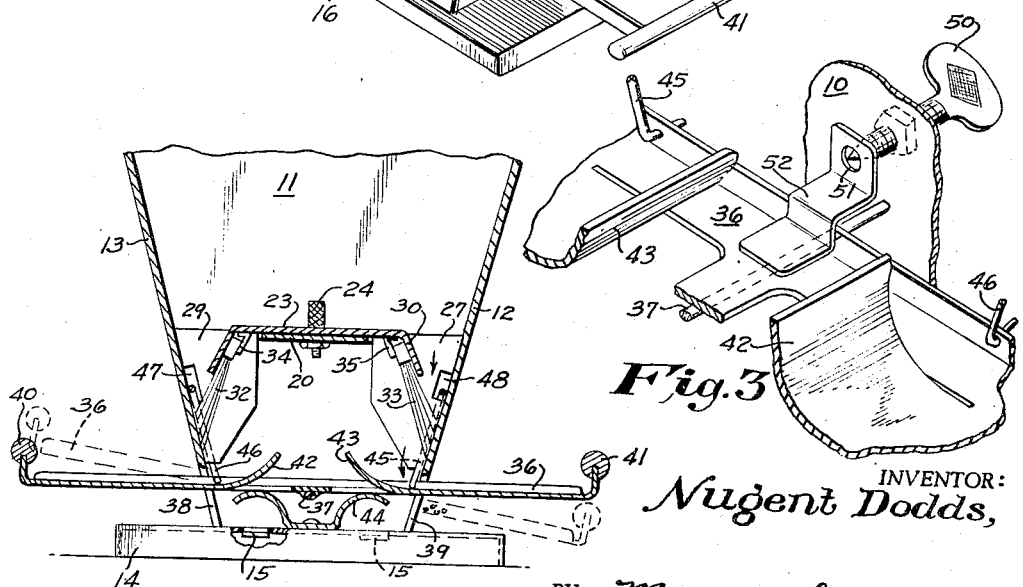
*Fig. 2*
*Fig. 3*
INVENTOR:
*Nugent Dodds,*
BY *Mauro & Lewis*
ATTORNEYS United States Patent Office 2,773,474
Patented Dec. 11, 1956

2,773,474

BIRD FEEDER

Nugent Dodds, Washington, D. C., assignor to George Hume, Washington, D. C.

Application November 10, 1954, Serial No. 467,923

8 Claims. (Cl. 119—55)

This invention relates to a new and novel dispensing device particularly intended to be useful for the feeding of birds, although the features of the invention may obviously be employed in the feeding of other animals or in the general dispensing of materials or particles in measured quantities from a storage area.

The general object of my invention is to provide a bird feeder having a protected storage bin for a supply of grain, seeds or the like, from which the feed is supplied in measured quantities to the birds by their actuation of special feed releasing means designed according to the invention.

A particular object of the invention is to provide in such a device feed releasing means which will dispense granular particles of feed of various sizes, bird feed used for the feeding of most birds being composed of many varieties of grain and seeds of substantially various sizes. the feeder according to the invention is especially designed to dispense such feed in measured quantities despite the passage through the device of relatively large seeds or grain which tend to release a flood of small seeds or grain when passing through the mouth of the dispenser.

A further object of the device is to provide a bird feeder with dispensing means capable of releasing very minute quantities of feed, for example, sufficient only to feed a small bird who has alighted on the dispensing means to actuate the device. The invention is accordingly capable of use for long periods of time without requiring attention or re-filling.

A further object of the invention is to provide adjusting means whereby the amount of feed to be released upon a single actuation of the dispensing means, can be regulated to deliver a relatively small or relatively large amount.

A further object of the invention is to provide a device of this character which has a minimum of parts and is designed so that access to it for cleaning and refilling is facilitated.

Other and further objects and advantages of the invention will be explained with respect to the drawing, wherein:

Fig. 1 is a perspective view of the feeding device according to the invention, with parts broken away;

Fig. 2 is a partial vertical section on lines 2—2 of Fig. 1; and

Fig. 3 is a fragmentary perspective view on a larger scale, showing part of the dispensing means and the feed regulating means.

In these figures the device is shown as formed in a four-sided container tapering from top to bottom, having front and rear walls 10 and 11 and side walls 12 and 13. These walls are secured to a rectangular base plate or stand 14 by means which may be easily disconnected such as tongue-and-slot connections 15 at the rear of the device (Fig. 2) and a tongue-and-pin connection 16 at the front of the device (Fig. 1). By such connections the base of the device may be removed for cleaning or for adjustment of the moving parts. The side walls of the device are covered at the top by a pitched roof 17 which is hinged to wall 13 by hinge 18 so that roof 17 can be swung open to give access to the feed storage area inside.

The device illustrated may be constructed of any suitable material such as wood or metal, but galvanized sheet metal has been found very suitable. The feeder is capable of operation when standing on its base, or it may be attached to or suspended from trees, posts, or other structures as circumstances may require. A bracket (not shown) may be soldered to wall 11 for this purpose.

The body of the device is divided into upper and lower sections by the platform 20, the upper part of the device being designed to contain a substantial amount of feed. Adjacent the midsection of each side wall 12 and 13, platform 20 contains rectangular apertures 21 and 22 through which the feed flows to the outside of the device by the novel dispensing means described below.

One element of the dispensing means consists of a yoke-shaped plate 23 which is fastened to the platform 20, as by a bolt 24, to facilitate removal. Plate 23 can be formed of a single sheet of metal in the shape shown in Figs. 1 and 2, to provide the projecting tapered flanges 26, 27, 28 and 29 and the depending end sections 30 and 31. The flanges being designed to abut the sloping walls 12 and 13 when plate 23 is fastened flat upon platform 20, these parts together form a pair of funnel-shaped chutes through which feed may be dispensed from the upper section of the device.

Secured to the under sides of end sections 30 and 31 of plate 23 are a pair of brushes 32 and 33, held in place by clamps 34—35. These brushes, as seen in Figs. 1 and 2, are mounted and proportioned to close the feed chutes just described and prevent egress of the feed until the device is actuated. Brushes 32—33, being set at an angle, extend into contact with the walls 13 and 12 respectively. Consequently, any feed passing out of the device must be forced by the brushes 32—33.

It will be recognized that the structure thus far described can be formed in other ways to provide the same result. For example, platform 20 and plate 23 could be formed in one piece to provide feed chutes of suitable shape. With respect to the brushes 32—33, any means composed of a plurality of filaments or bristles having a suitable degree of resiliency, will suffice to grasp and support feed particles of various sizes and prevent their egress until the dispensing parts are actuated. The bristles composing brushes 32—33 may therefore be of wire, wood fibre, plastic, hair, or the like. Experiment has shown that the bristles of an ordinary paint brush are well suited to the purpose.

The feed releasing means consists of a rockable feed pan 36 secured transversely of its midsection to a shaft 37 journaled in front and rear walls 10—11 just above the base plate 14 and beneath platform 20. The extremities of pan 36 pass through doors 38—39 formed respectively in side walls 13 and 12 and terminate in perches 40—41.

It will be appreciated that any feed falling from platform 20 through the feed chutes will fall on a part of the pan 36 located beneath, and be deflected through door 38 or 39 by means of the curved deflectors 42—43 positioned below the two feed chutes. Deflectors 42—43, as seen in Figs. 2 and 3, may be simply formed by cutting and bending strips from the central area of pan 36 adjacent to shaft 37.

In its horizontal position as shown in the drawings, feed pan 36 is in operative or neutral position and may be tilted in either direction, toward perch 40 or 41, by the action of a bird alighting thereon. Pan 36 may be provided with a return spring such as shown at 44 to restore it to horizontal position after the bird has departed. Obviously, spring 44 should be very flexible so that it will depress when pan 36 is actuated by a bird.

The feed releasing means consists of a pair of elements operating in the feed chutes, actuated by rocking movement of the feed pan, designed to draw or urge a portion of the feed filling the feed chutes past the brushes 32 and 33.

These may take the form of the wire bails 45—46 whose ends are supported in the flanged sides of the pan 36 and extend upwardly into the feed chutes, resting substantially flat on the side walls 12 and 13. Flanges 26, 27, 28 and 29 are provided with slotted edge portions 47—48 so that the horizontal upper sections of bails 45—46 may be moved up and down in the feed chutes.

The bails 45—46 are designed to perform an up-and-down stroke in the confines of the feed chutes thereby providing a reciprocating action. Their stroke is limited by the slots 47—48 to avoid contact and tangling of the bails 45—46 with the brushes 32—33, as seen in Fig. 2. The stroke of the bails may also be further regulated by adjusting the limits within which pan 36 may rock on shaft 37. Suitable regulating means are shown in Fig. 3, consisting of a pointed regulator screw 50 threadedly mounted in front wall 10. The tip of screw 50 projects into hole 51 formed in a strap 52 secured to pan 36. By this arrangement, the clearance between the pointed tip of screw 50 and hole 51 determines the freedom of movement of pan 36 and the connected bails 45—46. If screw 50 is fully open, movement is limited only by the aforesaid slots 47—48. If screw 50 is fully closed, pan 36 is locked and the feeder rendered inoperative. Fig. 3 shows the regulator screw in an intermediate position.

The operation of the device will now be described. By placing a supply of feed in the storage bin, a portion thereof will enter the feed chutes and come to rest in the crevices bounded by the walls 12—13 and the brushes 32—33 bearing against them. A bird alighting on perch 41, for example, will depress or tilt pan 36 in that direction, as shown in dotted lines, Fig. 2.

The tilting of pan 36 toward perch 41 will simultaneously depress bail 45, which is forced downwardly in the mass of grain in the chute, which movement will force a very small quantity of feed past the brush 33. Such feed will drop on deflector 43 and be passed into pan 36 adjacent perch 41. When the bird has departed, if a return spring such as spring 44 is employed, pan 36 will be returned to neutral position. No such spring is necessary, however, and the device may be left with perch 41 in a depressed position in which case no further feed will be released until a bird alights on perch 40 and actuates the opposite side of the feeder.

It will be appreciated that most conventional bird feeders are extremely wasteful of feed. The invention is designed, on the other hand, to release very minute quantities of feed and hence requires infrequent refilling.

It will be obvious that the feed delivery rate can be adjusted in various ways, such as by changing the stroke, size or shape of the bails 45—46 and the type or number of brushes employed in the brushes 32—33. It will also be clear that the invention is not limited to the dual chute form shown in the drawing. A single feed port and single feed pan form of device could be provided with slight alterations.

What is claimed is:

1. In a feeding device, a container for the feed to be dispensed, a delivery port leading from said container to a rockable feed pan, said port being normally held closed by a resilient brush-like member forming part of said port, and feed release means for said feed comprising a reciprocable member disposed in said port to force a portion of said feed past said resilient member, said feed release means being operatively connected to said rockable feed pan and movable therewith.

2. The invention according to claim 1, with means for regulating the stroke of said releasing means.

3. In a feeder of the type described, a housing, the upper part of which contains a platform defining a feed storage area, a pair of feed delivery chutes leading downwardly from said platform at opposite sides of said housing, a pair of resilient brushes disposed in said chutes normally tending to hold said chutes closed to the egress of feed doors in said housing beneath said chutes, a rockable feed pan journalled in said housing and extending externally of said housing through said doors, and feed releasing means comprising reciprocating members positioned to reciprocate in said chutes adjacent said resilient brushes, said releasing means being connected to opposite sides respectively of said feed pan and movable therewith to deliver feed from the chute adjacent the end of the pan which has been depressed.

4. The invention according to claim 3 with regulating means for adjusting the stroke of said releasing means.

5. The invention according to claim 3, the feed pan being provided with deflectors disposed beneath the respective feed chutes.

6. In a feeder, the combination comprising a container for the feed to be dispensed, a rockable feed pan, means defining a passageway leading from said container to said feed pan, resilient means in said passageway for normally holding said passageway closed, and means disposed adjacent said container and movable to force a portion of said feed past said resilient means, said latter means being operatively connected to said rockable feed pan and movable therewith.

7. In a feeder, the combination comprising means defining a source for granular material, means defining a feed area, a movable member adjacent said feed area, means defining a passageway between the source of granular material and the feed area, retarding means positioned in said passageway for yieldingly retarding the movement of granular material from the source to the feed area, actuating means positioned in said means defining the source for granular material, said means being movable for forcing granular material from said source into said passageway and thereby causing the granular material already in said passageway to be moved through the passageway to said feed area against the yielding retarding action of said retarding means, said actuating means being operatively connected to said movable member.

8. In a feeder, the combination comprising means defining a source for granular material, granular material within said source, means defining a feed area, a movable member adjacent said feed area, means defining a passageway between the source of granular material and the feed area, retarding means positioned in said passageway and yieldingly retarding the movement of granular material from the source to the feed area, means extending into said granular material and being movable for forcing granular material into said passageway and thereby causing the granular material already in said passageway to be moved through the passageway to said feed area against the yielding retarding action of said retarding means, said actuating means being operatively connected to said movable member.

References Cited in the file of this patent

UNITED STATES PATENTS

| 1,449,485 | Alspach | Mar. 27, 1923 |
| 2,640,464 | Jindrich | June 2, 1953 |
| 2,673,551 | McAnly | Mar. 30, 1954 |